United States Patent
Song et al.

(10) Patent No.: US 11,684,975 B2
(45) Date of Patent: Jun. 27, 2023

(54) DEVICE FOR FORMING BIMETAL COMPOSITE PIPE BY SPINNING SEMISOLID METAL POWDER ON OUTER WALL OF STEEL PIPE

(71) Applicant: Yanshan University, Qinhuangdao (CN)

(72) Inventors: Jianfeng Song, Qinhuangdao (CN); Dong Wang, Qinhuangdao (CN); Yinggang Shi, Qinhuangdao (CN); Xuan He, Qinhuangdao (CN); Hucheng Shang, Qinhuangdao (CN); Yonggang Dong, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 120 days.

(21) Appl. No.: 17/409,909

(22) Filed: Aug. 24, 2021

(65) Prior Publication Data
US 2022/0062991 A1 Mar. 3, 2022

(30) Foreign Application Priority Data
Aug. 27, 2020 (CN) .......................... 2020108794476

(51) Int. Cl.
*B22F 7/04* (2006.01)
*B21C 37/06* (2006.01)
(Continued)

(52) U.S. Cl.
CPC .................. *B22F 7/04* (2013.01); *B05C 5/00* (2013.01); *B21C 37/06* (2013.01); *B22D 19/16* (2013.01);
(Continued)

(58) Field of Classification Search
CPC ... B22D 19/16; B22F 3/24; B22F 7/08; B22F 7/06; B22F 2007/042; B22F 2999/00;
(Continued)

(56) References Cited

PUBLICATIONS

CN101724840, Wang including English abstract, published Jun. 9, 2010 (Year: 2010).*
(Continued)

*Primary Examiner* — Laura Edwards
(74) *Attorney, Agent, or Firm* — IPro, PLLC

(57) ABSTRACT

The present invention relates to a device for forming bimetal composite pipe by spinning semisolid metal powder on outer wall of steel pipe, which comprises feeding device, clamping device, spinning roller, hot melting head, motor, lifting device, work table, buffer bearing pack, tailstock support device and heat preservation device. According to the invention, three spinning rollers are adopted, so that spinning efficiency is increased, uniform stress is ensured, and the semisolid powder is uniformly spun on the outer wall of the metal pipe; the spinning roller adopts a taper design, so that forming resistance of the spinning device in the axial moving process can be effectively reduced, and the semisolid powder is uniformly covered on the outer wall of the steel pipe; the lifting device is added, so that the lifting device can be adjusted according to different pipe diameters to process different metal pipes; spring is additionally arranged at the bottom of the first bearing seat to avoid and reduce rigid impact between the steel pipe and the spinning rollers in the spinning process and ensure uniform surface appearance and structure of a spinning layer; in addition, the device is driven by a motor, and a screw rod is used for driving the frame to axially translate at a constant speed.

6 Claims, 5 Drawing Sheets

(51) Int. Cl.
| | |
|---|---|
| *B22D 19/16* | (2006.01) |
| *B22F 3/24* | (2006.01) |
| *B22F 7/08* | (2006.01) |
| *C23C 26/00* | (2006.01) |
| *B05C 5/00* | (2006.01) |

(52) U.S. Cl.
CPC ............... *B22F 3/24* (2013.01); *B22F 7/08* (2013.01); *C23C 26/00* (2013.01); *B22F 2003/248* (2013.01)

(58) Field of Classification Search
CPC ...... B22F 10/22; B22F 3/02; B22F 2003/242; B22F 5/106; B22F 12/226; B22F 2003/248; B22F 7/04; C23C 26/00; B33Y 10/00; B33Y 30/00; C21D 1/10; C21D 9/08; Y02P 10/25; B05C 5/00; B05C 5/0241; B21C 37/06
USPC .......................................... 118/308, 320, 409
See application file for complete search history.

(56) References Cited

PUBLICATIONS

CN204803356, Wu et al including English abstract, published Nov. 25, 2015 (Year: 2015).*
CN109290578, Wang et al including English abstract, published Feb. 1, 2019 (Year: 2019).*

* cited by examiner

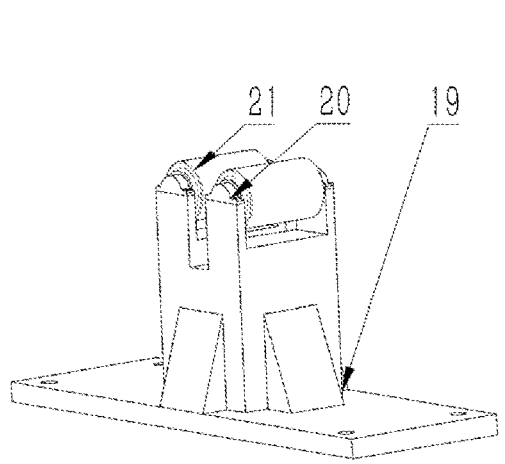 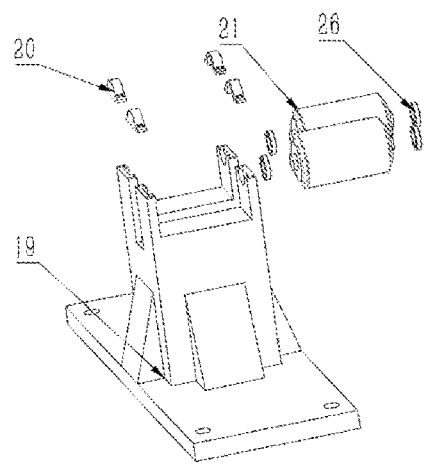
Fig. 9A　　　　　　　　Fig. 9B
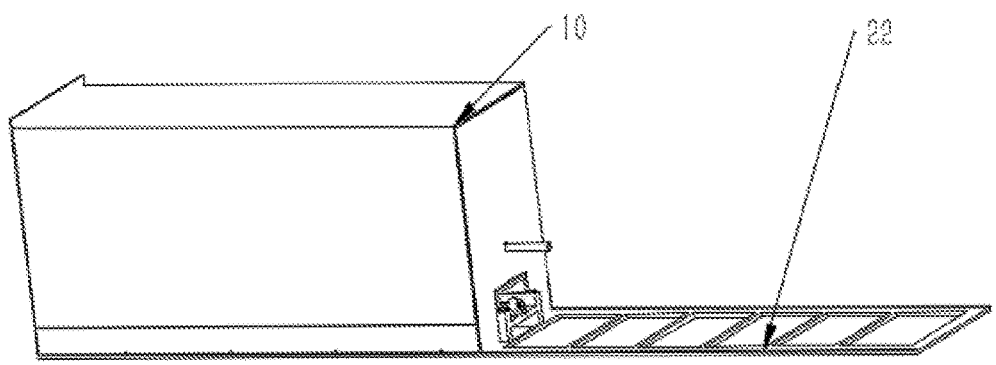
Fig. 10
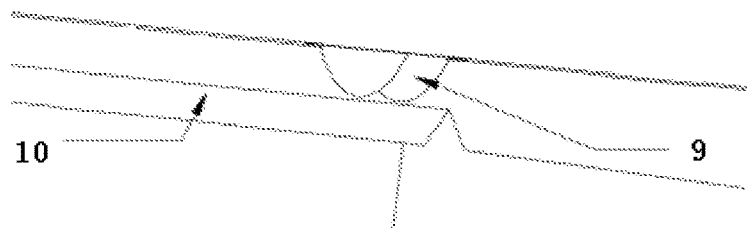
Fig. 11

DEVICE FOR FORMING BIMETAL COMPOSITE PIPE BY SPINNING SEMISOLID METAL POWDER ON OUTER WALL OF STEEL PIPE

TECHNICAL FIELD

The present invention relates to the technical field of bimetal pipe compounding, in particular to a device for forming a bimetal composite pipe by spinning semisolid metal powder on an outer wall of a steel pipe.

BACKGROUND

The bimetal composite pipe has excellent anticorrosion and oxidation resistance, and is widely applied to the industries of ocean engineering, energy, chemical engineering and mechanical manufacturing. With the application fields of the composite pipes becoming wider and wider, the requirements on the metal characteristics and the performance and strength of the bimetal joint surface become higher and higher, and therefore higher requirements are put forward on the processing and manufacturing process of the bimetal composite pipe.

The bimetal composite pipe is generally formed by compounding two metals with larger differences in physical and mechanical property characteristics, so that the difficulty of the compound forming of the bimetal pipe is larger, and the compound process of the bimetal pipe is continuously developed. At present, the bimetal pipe compounding is mainly divided into a solid-solid processing technology and a solid-liquid processing technology. The solid-solid production process mainly comprises the following steps: an outer covering welding rolling production process, a bimetal casing rolling production process, a bimetal cast casing extrusion production process and a bimetal cast casing planetary rolling production process. The solid-liquid production process adopts a casting principle and mainly comprises a core filling continuous casting composite production process and a double-crystallizer continuous casting production process. The performance of the composite pipe produced by the solid-solid process is greatly influenced by the physical and mechanical properties of the two bimetal composite pipes, the strength of a joint surface is not ensured well, and the solid-liquid production process has large occupied area of equipment and high equipment investment and maintenance cost. The invention provides a bimetal composite pipe formed by spinning semisolid metal powder on the outer wall of a steel pipe, integrates the advantages of a solid-solid production process and a solid-liquid production process, has simple and flexible equipment operation, low investment, near metallurgical bonding of a bimetal bonding surface, good bonding compactness, high bonding strength and small influence of the property difference of two different metals on the performance of the bimetal composite pipe, and is particularly suitable for producing the bimetal composite pipe with large differences in physical and mechanical properties.

DISCLOSURE OF INVENTION

In order to solve the defects of the prior art, the present invention provides a device for forming a bimetal composite pipe by spinning semisolid metal powder on an outer wall of a steel pipe.

The present invention provides a device for forming a bimetal composite pipe by spinning semisolid metal powder on an outer wall of a steel pipe, comprising a feed device, a clamping device, a lifting device, a spinning device, a hot melting head, a buffer bearing pack, a tail support device and a heat preservation cover, wherein the feed device comprises a feed motor, a bearing seat, a first coupling, a first lead screw and a first lead screw nut, wherein the feed motor is connected with the first lead screw through the first coupling, both ends of the first lead screw are supported through bearings, the first lead screw is connected with the work table, and the feed motor drives the first lead screw to rotate so as to drive the first lead screw nut and the work table to axially translate; the working table is provided with a lifting device, an isolation cover filled with protective gas and a spinning device, and the spinning device comprises a spinning roller, an electromagnetic induction heating device and a buffer bearing seat so as to uniformly spin semisolid powder on the outer wall of the metal pipe; the lifting device comprises a lifting motor, an upper bearing seat, a second coupling, a second lead screw, an upper frame, a lower bearing seat, a second lead screw nut and a plate, the second lead screw is connected with the lifting motor through the second coupling, and the second lead screw drives the second lead screw nut and the frame to move up and down under the drive of the lifting motor, so that the installation and debugging of steel pipes with different pipe diameters are realized; the buffer bearing pack comprises a light spring, a first bearing, a check bolt, a buffer bearing seat and a bearing end cover, the buffer bearing seat is fixedly connected with the work table through the check bolt, the light spring is sleeved on the check bolt coaxially, a groove corresponding to the light spring is formed in the bottom of the buffer bearing seat, the first bearing is installed in the buffer bearing seat, which is axially positioned and fixed through the bearing end cover; the tail support device comprises a tail support frame, a tail bearing seat, a tail supported roller and a second bearing, wherein both ends of the tail supported roller are supported by the second bearing, the second bearing is arranged in the tail bearing seat, the tail support frame is fixedly connected with the work table, and the tail bearing seat is fixedly connected with the tail support frame; the heat preservation cover is connected with a guide rail through a pulley.

Preferably, in the lifting device, both ends of the second lead screw are supported by the upper bearing seat and the lower bearing seat, the lower bearing seat is a bearing end, the upper bearing seat is a support end, an angular contact bearing is arranged at the lower bearing seat, and a deep groove ball bearing is arranged at the upper bearing seat.

Preferably, the spinning device adopts three spinning rollers which are arranged in an inverted triangle to reduce the rigid impact between the steel pipe and the spinning rollers in the spinning process, and the spinning rollers adopt a taper design to fully coat the semisolid powder on the steel pipe in the axial direction; the metal powder is heated to be semisolid through the hot melting head and is uniformly coated on the steel pipe rotating at a constant speed, and the three spinning rollers are heated by adopting electromagnetic induction so as to prevent the semisolid powder from being adhered to the spinning rollers in the processing process.

Preferably, the electromagnetic induction heating device and the spinning roller are fixedly connected with the frame and the work table respectively, the check bolt can meet the working requirement of translation due to stress buffering, the hot melting head is fixedly connected with the frame, and the spinning roller is supported by the buffer bearing seat.

Preferably, the tail bearing seat is connected with the tail support frame up and down, the tail bearing seat is in interference fit with the second bearing, and the tail support device is provided with two sets of tail supported rollers to ensure the stability of the steel pipe during processing.

Preferably, the clamping device is provided with a clamping motor, and the clamping motor is connected with the clamping device through a worm and gear transmission structure to realize self-locking.

Compared with the prior art, the present invention has the following beneficial effects:

(1) according to the invention, three spinning rollers are adopted, so that the spinning efficiency is increased, the uniform stress is ensured, and the semisolid powder is uniformly spun on the outer wall of the metal pipe;

(2) the spinning roller adopts a taper design, so that the forming resistance of the spinning device in the axial moving process can be effectively reduced, and the semisolid powder is uniformly covered on the outer wall of the steel pipe; the lifting device is added, so that the lifting device can be adjusted according to different pipe diameters to process different metal pipes;

(3) springs are additionally arranged at the bottoms of the bearing seats of the two upper spinning rollers so as to avoid and reduce rigid impact between the steel pipe and the spinning rollers in the spinning process and ensure the uniform surface appearance and structure of a spinning layer; in addition, the device is driven by a motor, and a screw rod is used for driving the spinning device to axially translate at a constant speed;

(4) the surface of the spinning roller is heated by electromagnetic induction, the outer wall of the steel pipe is heated by a coil, a heat preservation cover is arranged outside to reduce residual stress and avoid phase change of a spinning layer due to rapid cooling, and protective gas is added inside to prevent a spinning composite layer from being oxidized, so that the mechanical property and the bonding strength of the bimetal composite pipe are ensured.

DESCRIPTION OF THE DRAWINGS

FIG. 9A is a perspective view of the tail support device;

FIG. 9B is an exploded view of the tail support device;

FIG. 10 is a perspective view of the heat preservation device of the present invention; and FIG. 11 is a schematic view of the axial translation of the heat preservation device of the present invention.

REFERENCE NUMERALS

Figure 1:
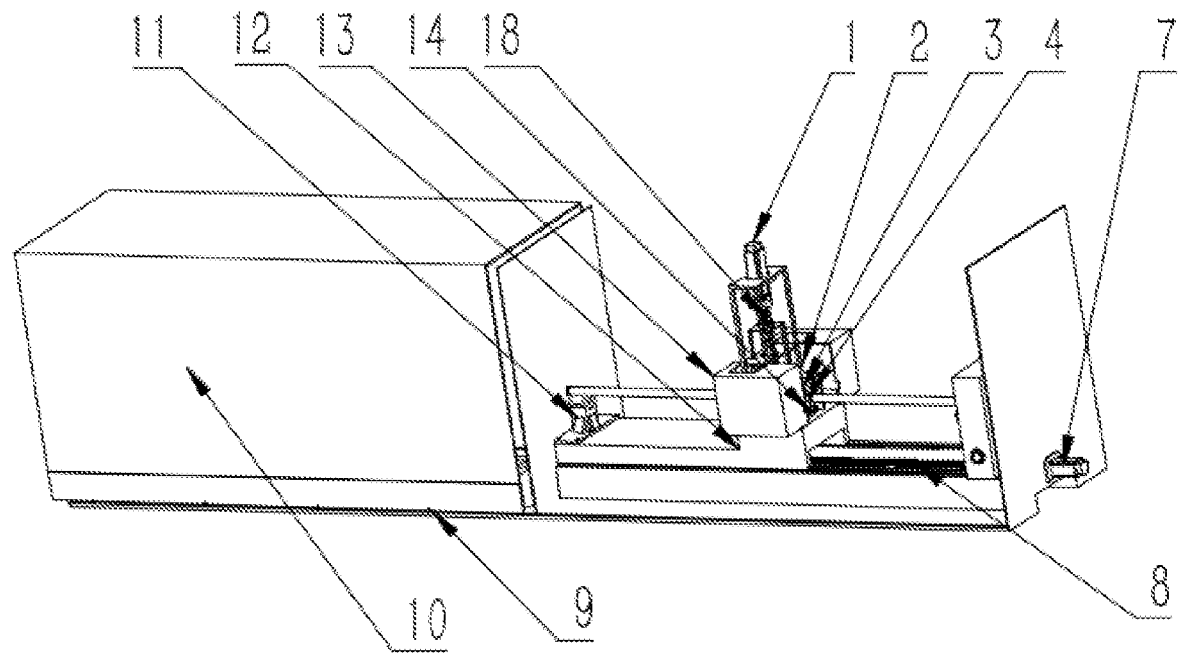
FIG. 1 is a perspective view of the present invention for spin coating or repairing the outer wall of a metal pipe with semisolid powder.
Figure 2:
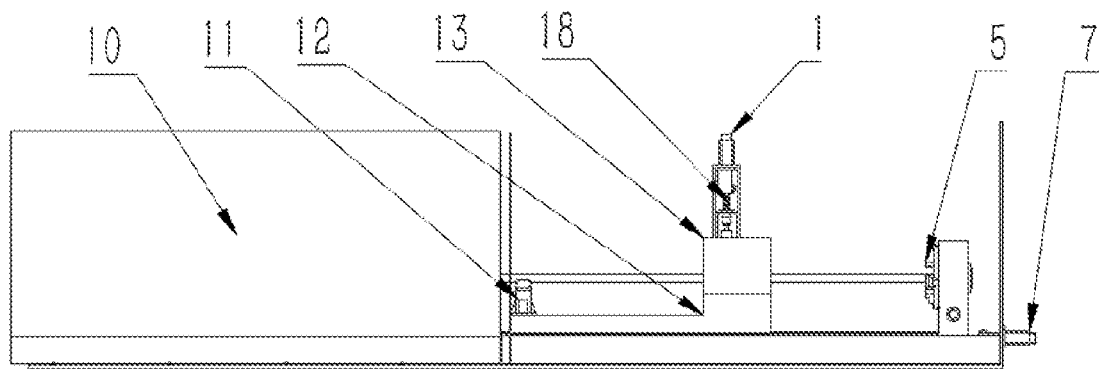
FIG. 2 is a side view of the present invention for spin coating or repairing the outer wall of a metal pipe with semisolid powder.

1. lifting motor; 2. hot melting head; 3. spinning roller; 4. heating coil; 5. clamping device; 6. clamping motor; 7. feed motor; 8. feed device; 9. pulley; 10. heat preservation cover; 11. tailstock support device; 12. work table; 13. isolation cover; 14. buffer bearing pack; 15. light spring; 16. hydraulic lifting device; 17. electromagnetic induction heating device; 18. lifting device; 19. tail support frame; 20. tail bearing seat; 21. tail supported roller; 22. guide rail of the pulley; 23. first bearing; 24. check bolt; 25. buffer bearing seat; 26. second bearing; 27. upper bearing seat; 28. second coupling; 29. second lead screw; 30. upper frame; 31. lower bearing seat; 32. second lead screw nut; 33. plate; 34. bearing end cover.

DETAILED DESCRIPTION

The technical solutions in the embodiments of the present invention will be clearly and completely described below with reference to the drawings in the embodiments of the present invention. All other embodiments, which can be obtained by a person skilled in the art without making any creative effort based on the embodiments in the present invention, belong to the protection scope of the present invention.

It is to be noted that, unless otherwise specified, technical or scientific terms used herein shall have the ordinary meaning as understood by those skilled in the art to which the present invention belongs.

The present invention provides a device for forming a bimetal composite pipe by spinning semisolid metal powder on an outer wall of a steel pipe and a detection device thereof, which are further described in detail with reference to the accompanying drawings and the detailed description.

As shown in FIG. 1 to FIG. 3B, a device for forming a bimetal composite pipe by spinning semisolid metal powder on the outer wall of a steel pipe mainly comprises a feed device 8, a clamping device 5, a lifting device 18, a spinning device, a hot melting head 2, a buffer bearing pack, a tail support device and a heat preservation cover 10.

The feed device 8 comprises a feed motor 7, a bearing seat, a first coupling, a first lead screw and a first lead screw nut, the feed motor 7 is connected with the first lead screw through the first coupling, the first lead screw is connected with the work table 12, both ends of the first lead screw are supported through bearings, the feed motor 7 drives the first lead screw to rotate, the first lead screw nut is axially translated with the work table 12, the work table 12 is provided with a lifting device 18, an isolation cover 13 filled with protective gas and a spinning device arranged to uniformly spin semisolid powder on the outer wall of the metal pipe.

The lifting device 18 comprises a lifting motor 1, an upper bearing seat 27, a second coupling 28, a second lead screw 29, an upper frame 30, a lower bearing seat 31, a second lead screw nut 32 and a plate 33, wherein both ends of the second lead screw 29 are supported through the upper bearing seat 27 and the lower bearing seat 31, the second lead screw 29 is connected with the lifting motor 1 through the second coupling 28, angular contact bearing is selected at the bearing end, and deep groove ball bearing is selected at the support end. Through the drive of lifting motor 1, the second lead screw 29 drives the second screw nut 32 and the frame to move up and down, so that the mounting and debugging processes for processing steel pipes with different pipe diameters are simple, and its adaptability is enhanced. The lifting device 18 adopts an up-down structure, and the design facilitates the installation of the device and the simplicity and convenience of operation.

Figure 4:
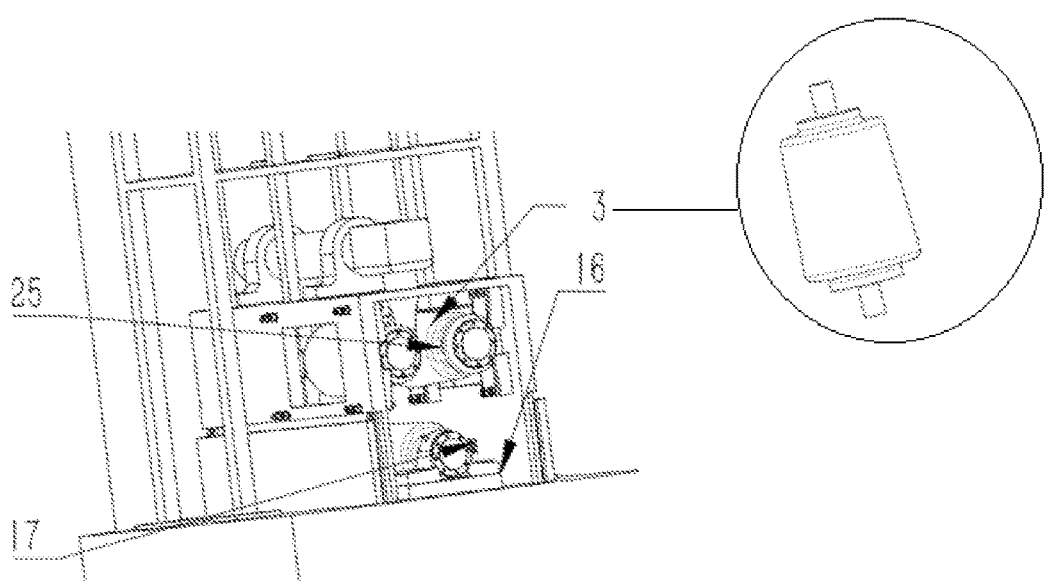
FIG. 4 is a perspective view of the spinning device of the present invention.
Figure 5:
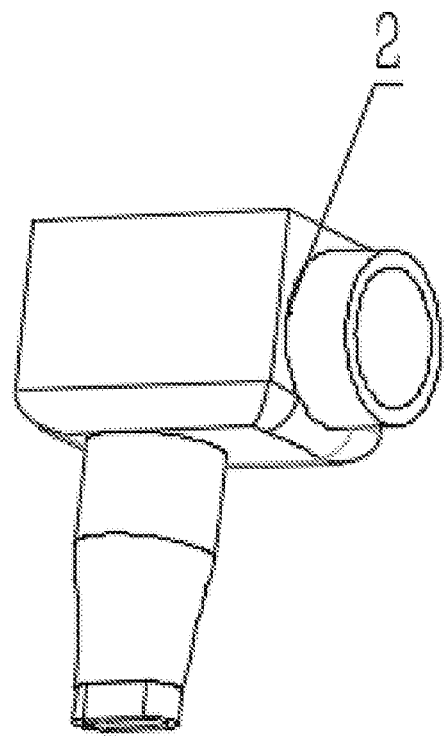
FIG. 5 is a perspective view of the hot melting head of the present invention.

As shown in FIG. 4 and FIG. 5, the spinning device of the present invention includes spinning rollers 3, an electromagnetic induction heating device 17 and a buffer bearing seat 25, the spinning device adopts three spinning rollers arranged in an inverted triangle shape to reduce or avoid rigid impact between the steel pipe and the spinning roller during spinning, so as to ensure uniform surface appearance and structure of a spinning layer. The spinning rollers 3 adopt a taper design, so that the semisolid powder is fully coated on the steel pipe along an axial direction, and a high utilization rate of the semisolid powder is ensured. In addition, the processed powder is heated to a semisolid state through the hot melting head 2 and is uniformly coated on a steel pipe rotating at a constant speed, and the three spinning rollers are heated by electromagnetic induction, so that the semisolid powder and the spinning rollers are prevented from being adhered in the processing process, the service life of the spinning rollers is prolonged, and the operation maintenance time of the equipment is shortened. The electromagnetic induction heating device 17 and the spinning rollers 3 are fixedly connected with the frame and the work table 12 respectively, and the check bolt 24 can meet the working requirement of translation due to stress buffering. The hot melting head 2 is fixedly connected with the frame, and the spinning rollers 3 are supported through buffer bearing seats 25.

Figure 6:
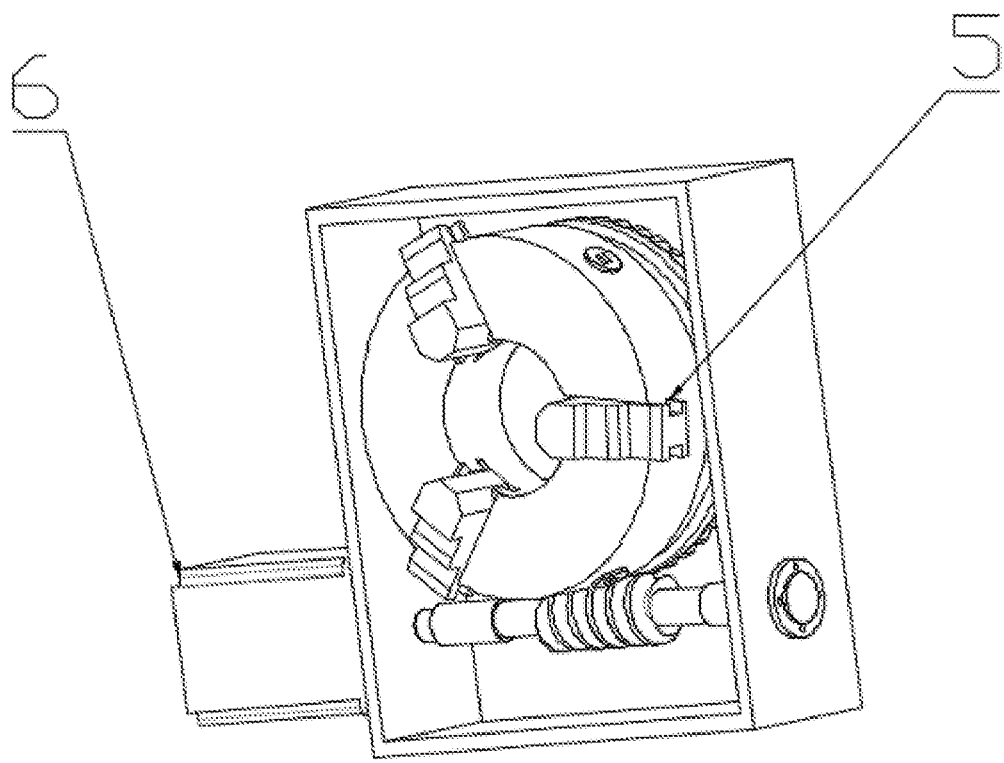
FIG. 6 is a perspective view of the clamping device of the present invention.

As shown in FIG. 6, after being clamped by the clamping device 5, the processed steel pipe is driven by the clamping motor 6 to rotate at a constant speed, so as to ensure uniform coating of the semisolid powder. A worm and gear driving mode is adopted between the clamping motor 6 and the clamping device 5, which has the advantages of self-locking, low noise and small vibration.

Figure 7:
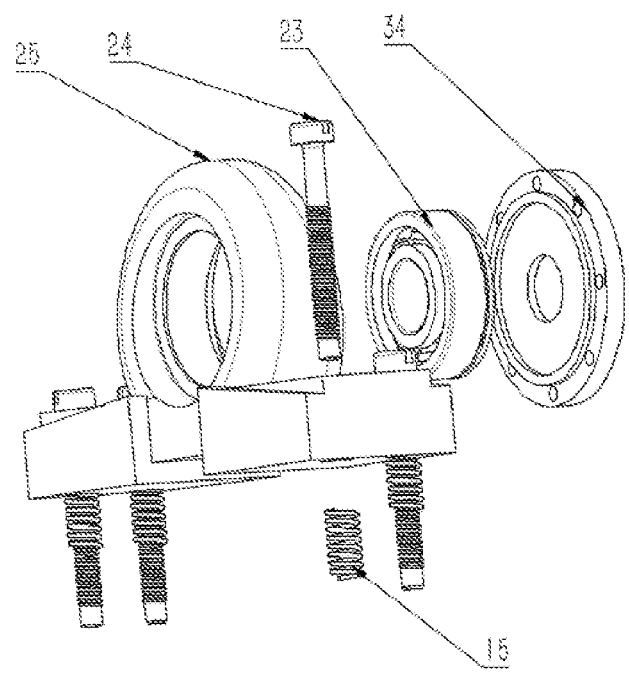
FIG. 7 is an exploded view of the buffer bearing pack of the present invention.

As shown in FIG. 4 and FIG. 7, the buffer bearing pack 14 includes a light spring 15, a first bearing 23, a check bolt 24, a buffer bearing seat 25 and a bearing end cover 34, a groove corresponding to the spring is formed in the bottom of the buffer bearing seat 25 to ensure accurate positioning of the light spring in the installation and processing process, the spring is installed at the bottom of the buffer bearing seat 25 to ensure buffer stress when a steel pipe is processed, the buffer bearing seat 25 is fixedly connected with the work table 12 through the check bolt 24, the light spring 15 is sleeved on the check bolt 24 and has a certain gap therebetween, the first bearing 23 is installed in the buffer bearing seat 25, and axial positioning and fixing are performed by the bearing cover 34.

Figures 3A, 3B:
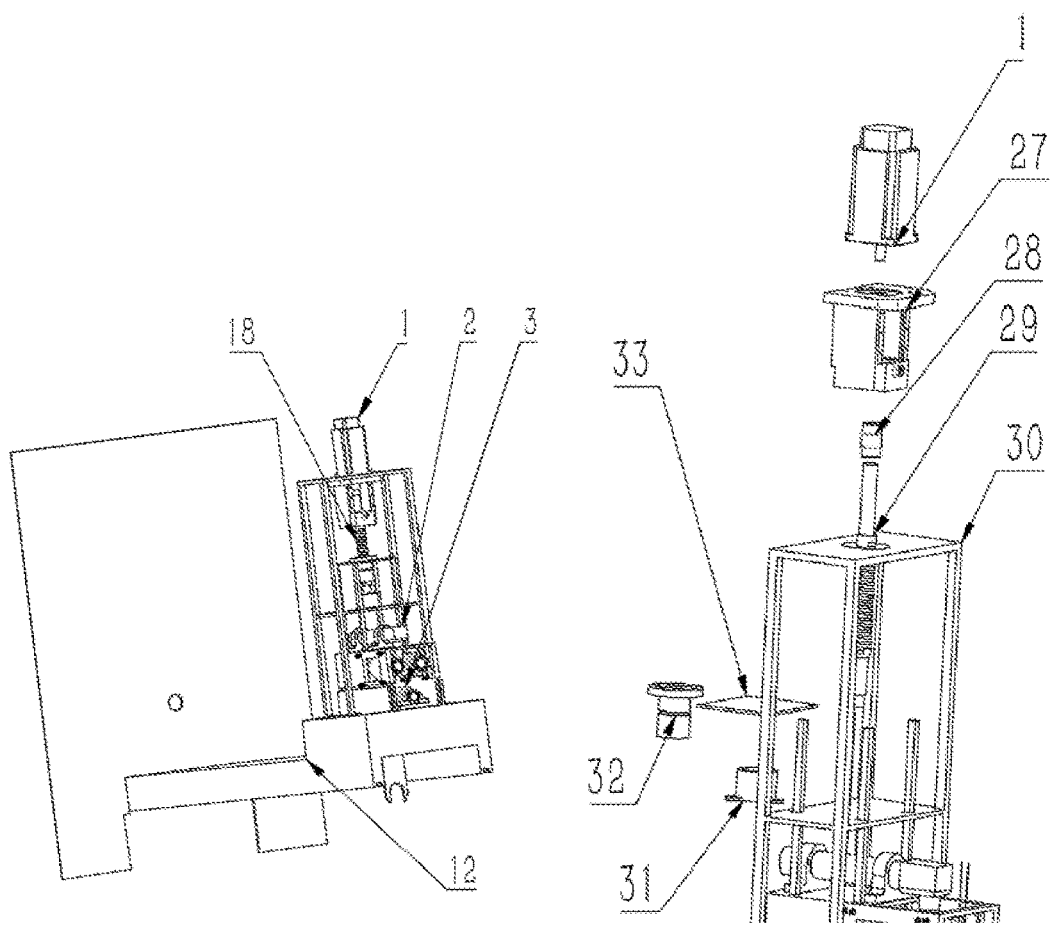
FIG. 3A is a perspective view of a motor, lifting device, spinning roller, spinning assembly of the present invention.
FIG. 3B is an exploded view of the motor, lifting device, spinning roller, spinning assembly of the present invention.
Figure 8:
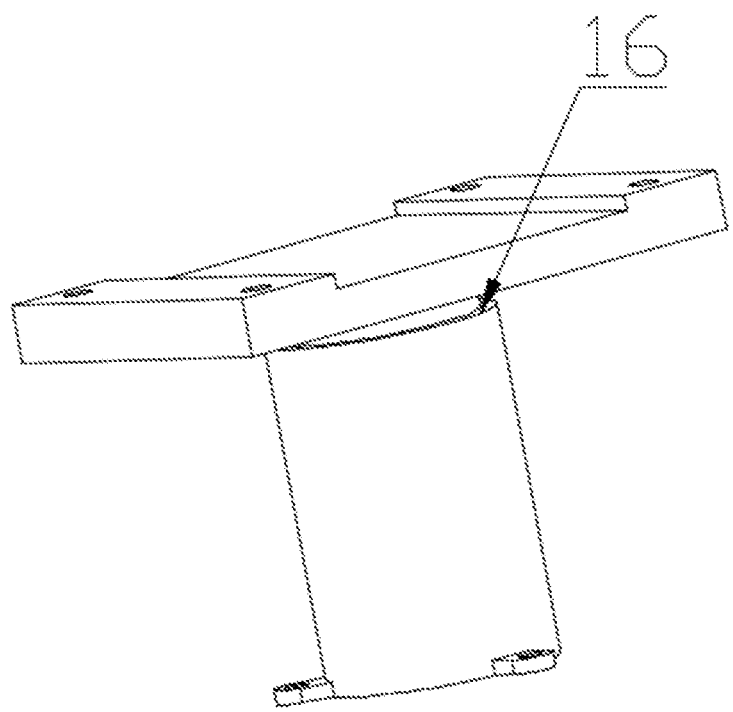
FIG. 8 is a perspective view of the lifting device of the present invention.

As shown in FIG. 4 and FIG. 8, the hydraulic lifting device 16 is embedded in the work table 12 and fixedly connected with the work table 12, and the hydraulic lifting device 16 cooperates with the lifting device in FIG. 3A to machine steel pipes with different pipe diameters. When a steel pipe having a large pipe diameter is processed, the lifting device of FIG. 3A performs an operation of raising and the hydraulic lifting device 16 performs a hydraulic lowering, and when a steel pipe having a small pipe diameter is processed, the lifting device of FIG. 3A performs an operation of lowering and the hydraulic lifting device 16 performs a hydraulic lowering.

As shown in FIG. 9A and FIG. 9B, the tail support device 11 includes a tail support frame 19, a tail bearing seat 20, a tail supported roller 21 and a second bearing 26, both ends of the tail supported roller 21 are supported by the second bearing 26, the second bearing 26 is installed inside the tail bearing seat 20, the tail bearing seat 20 is connected with the tail support frame 19, wherein the tail bearing seat 20 is above the tail support frame 19, so that the second bearing 26 can be installed and detached conveniently, and the tail support device 11 is provided with two sets of tail supported rollers 21. The tail support device 11 ensures the stability when the steel pipe is processed, the shaking is not generated in the processing process so as to ensure the processing precision, the length range of the processed steel pipe is greatly increased by the design of the tail support device, and the adaptability of the equipment is enhanced. The tail support frame 19 is fixedly connected with the work table 12, the tail bearing seat 20 is fixedly connected with the tail support frame 19, and the tail supported roller 21 can rotate circumferentially.

As shown in FIG. 10 and FIG. 11, the heat preservation in the processing process is realized through the heat preservation cover 10 so as to reduce the residual stress, and the phase change of the spinning layer caused by rapid cooling is avoided, the protective gas is added inside the isolation cover 13 so as to prevent the oxidation of the spinning composite layer, the heat preservation cover 10 realizes the axial translation through the guide rail 22 of the pulley 9 and the pulley 9, the moving mode of the heat preservation cover 10 reduces the processing operation time, the installation of other devices and the later maintenance are facilitated, and the practicability of the whole operation of the equipment is greatly increased. The heat preservation cover 10 is made of a thin heat-insulating material, is light in weight and is easy to push and pull manually along a sliding rail.

The operation process of the present invention is as follows:

the clamping device 5 is used for clamping the steel pipe, the drive of the clamping motor 6 realizes uniform rotation of the steel pipe, the axial movement of the main structure on the work table is realized, the feed motor 7 is used for realizing uniform axial feeding of the work table, then the driving screw of the lifting motor 1 is used for driving the frame to move up and down, the processing height is adjusted to adapt to different pipe diameters of the processed steel pipe, the processing difficulty and time are reduced, the processing efficiency is improved, the range of the processed pipe diameters is widened, and the debugging work is simpler.

The position of the heat preservation cover 10 in the processing process is shown in FIG. 10, and the isolation cover 13 is filled with protective gas to prevent the spinning composite layer from being oxidized, so that the mechanical property and the bonding strength of the bimetal composite pipe are ensured. The powder used for processing is heated to be semisolid through the hot melting head 2 and coated on the steel pipe rotating at a constant speed, the steel pipe is heated through the heating coil 4 at the moment, the three spinning rollers 3 are also heated through the electromagnetic induction heating device, and the preheating treatment is carried out to increase the bonding strength of the bimetal composite pipe. The light springs are additionally arranged at the bottoms of the buffer bearing seats 25 of the two upper spinning rollers 3, so that the rigid impact between the steel pipe and the spinning rollers 3 in the spinning process is avoided and reduced, and the uniform surface appearance and structure of a spinning layer are ensured. The tail support device 11 ensures the stability of the steel pipe in the processing process.

The above description is only for the purpose of describing the preferred embodiment of the present invention, and is not intended to limit the scope of the present invention, and any variations and modifications made by those skilled in the art based on the above disclosure are intended to fall within the scope of the appended claims.

The above-mentioned embodiments are only used for illustrating the technical solutions of the present invention, and not for limiting the same; although the present invention has been described in detail with reference to the foregoing embodiments, it should be understood by those of ordinary skill in the art that: the technical solutions described in the foregoing embodiments can still be modified, or some or all of the technical features thereof can be equivalently replaced; and the modifications or the substitutions do not make the essence of the corresponding technical solutions depart from the scope of the technical solutions of the embodiments of the present invention.

What is claimed is:

1. A device for forming a bimetal composite pipe by spinning semisolid metal powder on an outer wall of a steel pipe, comprising a feed device, a lifting device, a spinning device, a buffer bearing pack, a tail support device and a heat preservation cover, wherein the feed device comprises a feed motor, a bearing seat, a first coupling, a first lead screw and a first lead screw nut, wherein the feed motor is connected with the first lead screw through the first coupling, both ends of the first lead screw are supported through bearings, the first lead screw is connected with a work table, and the feed motor drives the first lead screw to rotate so as to drive the first lead screw nut and the work table to axially translate;

the working table is provided with a lifting device, an isolation cover filled with protective gas and a spinning device, and the spinning device comprises a spinning roller, an electromagnetic induction heating device and a buffer bearing seat so as to uniformly spin semisolid powder on the outer wall of the steel pipe;

the lifting device comprises a lifting motor, an upper bearing seat, a second coupling, a second lead screw, an upper frame, a lower bearing seat, a second lead screw nut and a plate, the second lead screw is connected with the lifting motor through the second coupling, and the second lead screw drives the second lead screw nut and the frame to move up and down under the drive of the lifting motor, to install and adjust the pipe;

the buffer bearing pack comprises a lightweight spring, a first bearing, a check bolt, a buffer bearing seat and a bearing end cover, the buffer bearing seat is fixedly connected with the work table through the check bolt, the lightweight spring is sleeved on the check bolt coaxially, a groove corresponding to the lightweight spring is formed in the bottom of the buffer bearing seat, the first bearing is installed in the buffer bearing seat, which is axially positioned and fixed through the bearing end cover;

the tail support device comprises a tail support frame, a tail bearing seat, a tail supported roller and a second bearing, wherein both ends of the tail supported roller are supported by the second bearing, the second bearing is arranged in the tail bearing seat, the tail support frame is fixedly connected with the work table, and the tail bearing seat is fixedly connected with the tail support frame;

the heat preservation cover is connected with a guide rail through a pulley.

2. The device according to claim 1, wherein in the lifting device, both ends of the second lead screw are supported by the upper bearing seat and the lower bearing seat, the lower bearing seat is a bearing end, the upper bearing seat is a support end, an angular contact bearing is arranged at the lower bearing seat, and a deep groove ball bearing is arranged at the upper bearing seat.

3. The device according to claim 2, wherein the spinning device adopts three spinning rollers which are arranged in an inverted triangle to reduce the rigid impact between the steel pipe and the spinning rollers in the spinning process, and the spinning rollers taper to fully coat the semisolid powder on the steel pipe in the axial direction; the metal powder is heated to be semisolid through a hot melting head and is uniformly coated on the steel pipe rotating at a constant speed, and the three spinning rollers are heated by adopting electromagnetic induction so as to prevent the semisolid powder from being adhered to the spinning rollers in the processing process.

4. The device according to claim 1, wherein the electromagnetic induction heating device and the spinning roller are fixedly connected with the frame and the work table respectively, a hot melting head is fixedly connected with the frame, and the spinning roller is supported by the buffer bearing seat.

5. The device according to claim 3, wherein the tail bearing seat is connected with the tail support frame up and down, the tail bearing seat is in interference fit with the second bearing, and the tail support device is provided with two sets of tail supported rollers to ensure the stability of the steel pipe during processing.

6. The device according to claim 1, further comprising a clamping device, wherein the clamping device is provided with a clamping motor, and the clamping motor is connected with the clamping device through a worm and gear transmission structure to realize self-locking.

* * * * *